United States Patent
Buzzard

(10) Patent No.: US 12,510,157 B2
(45) Date of Patent: Dec. 30, 2025

(54) ELASTOMER ENERGIZED MANWAY GASKET

(71) Applicant: TRELLEBORG SEALING SOLUTIONS US, INC., Ft. Wayne, IN (US)

(72) Inventor: Cody Buzzard, Ft. Wayne, IN (US)

(73) Assignee: TRELLEBORG SEALING SOLUTIONS US, INC., Ft. Wayne, IN (US)

( * ) Notice: Subject to any disclaimer, the term of this patent is extended or adjusted under 35 U.S.C. 154(b) by 0 days.

(21) Appl. No.: 18/163,849

(22) Filed: Feb. 2, 2023

(65) Prior Publication Data

US 2024/0263702 A1 Aug. 8, 2024

(51) Int. Cl.
*F16J 15/10* (2006.01)

(52) U.S. Cl.
CPC .................... *F16J 15/102* (2013.01)

(58) Field of Classification Search
CPC .......... F16J 15/102; F16J 15/06; F16J 15/062; F16J 15/10; F16J 15/104
See application file for complete search history.

(56) References Cited

U.S. PATENT DOCUMENTS

| | | | | |
|---|---|---|---|---|
| 3,124,502 A | * | 3/1964 | Rake | F16J 15/20 |
| | | | | 428/378 |
| 5,277,433 A | * | 1/1994 | Ishikawa et al. | F16J 15/0825 |
| | | | | 277/593 |
| 5,338,046 A | * | 8/1994 | Willis, Jr. | F02F 11/002 |
| | | | | 277/592 |
| 5,362,074 A | * | 11/1994 | Gallo | F16J 15/122 |
| | | | | 277/592 |
| 2003/0173747 A1 | * | 9/2003 | Mickelson | F16J 15/123 |
| | | | | 277/601 |
| 2004/0108660 A1 | * | 6/2004 | Frew | F16J 15/122 |
| | | | | 277/628 |
| 2005/0134006 A1 | * | 6/2005 | Adams | F16J 15/0825 |
| | | | | 277/601 |
| 2010/0282124 A1 | * | 11/2010 | Blevins, Jr. | B61D 5/08 |
| | | | | 105/377.08 |
| 2011/0107940 A1 | * | 5/2011 | Borowski | B61D 5/08 |
| | | | | 277/648 |

(Continued)

*Primary Examiner* — Gilbert Y Lee
(74) *Attorney, Agent, or Firm* — Orbit IP, LLP; Marc G. Martino

(57) ABSTRACT

A manway gasket includes a seal body having an annular plate shape defining an inner diameter concentrically disposed within an outer diameter and a thickness bounded by an upper surface opposite a lower surface. The upper surface is configured to abut and/or be adjacent to an inside surface of a dovetail groove of a manway cover. A circumferential channel is formed in the seal body, the circumferential channel open to and starting from the outer diameter and extending inwards towards the inner diameter while not penetrating through the inner diameter. An O-ring is disposed within the circumferential channel. An annularly shaped locking ring is at least partially disposed within the circumferential channel adjacent the O-ring. The O-ring is fully enclosed within the circumferential channel by the seal body and the locking ring. No adhesive, glues or bonding agents are used in the manway gasket.

20 Claims, 7 Drawing Sheets

(56) References Cited

U.S. PATENT DOCUMENTS

2013/0038027 A1\* 2/2013 Feldner ................. F16J 15/121
  277/591
2015/0329284 A1\* 11/2015 Benet ..................... B65D 53/02
  220/378

\* cited by examiner

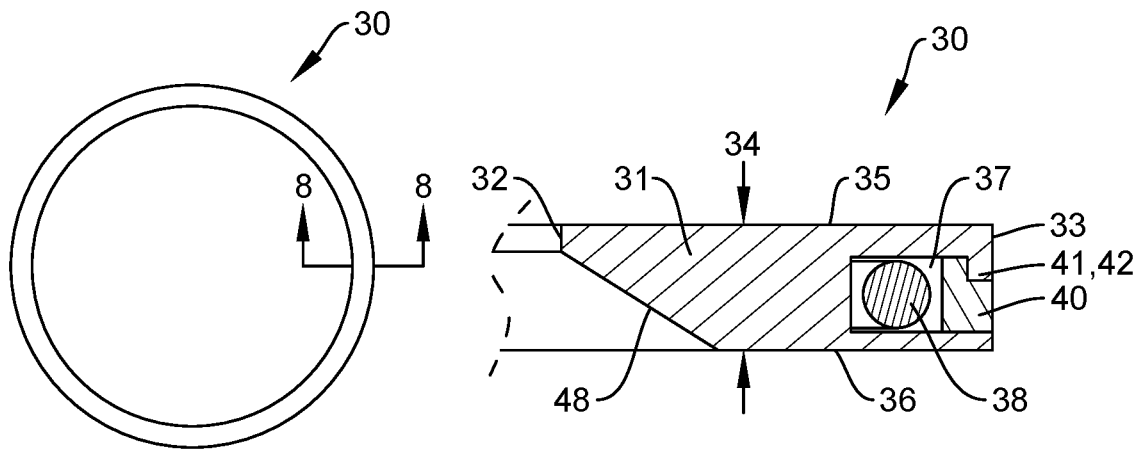
FIG. 7
FIG. 8
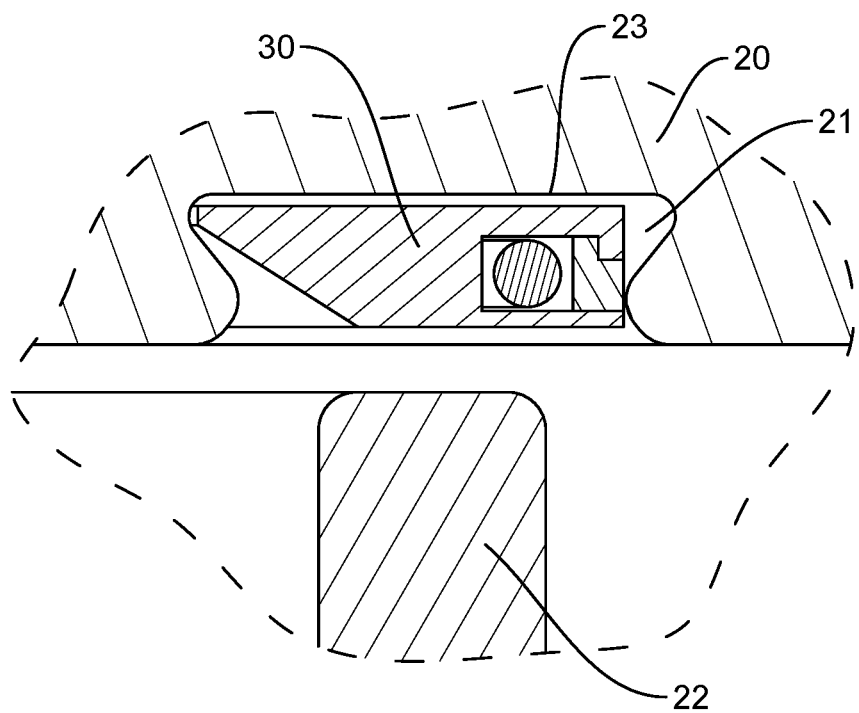
FIG. 9

ELASTOMER ENERGIZED MANWAY GASKET

CROSS-REFERENCE TO RELATED APPLICATIONS

None

DESCRIPTION

Field of the Invention

The present invention generally relates to seals. More particularly, the present invention relates to a seal for a manway cover on a railway tanker car and the like.

Background of the Invention

A manway gasket is designed to act as a seal to prevent leakage from the cover of a manway on a railway tanker car. The manway is a large opening (usually 18"-28" in diameter) in the top of tanker cars to allow an inspector to enter the car and perform required inspections from the inside of the tanker car between uses. When not in use, the manway has a cover bolted in place. This gasket (i.e., a manway gasket) is used to better seal the cover to the manway to prevent any leakage.

There are several competitor designs that were purchased, analyzed and reverse engineered prior to product development of the present invention. One such prior art design is that of a PTFE only seal where the entire gasket is manufactured from PTFE. Another design has an upper and lower portion made from PTFE with an in inner portion made from an expanded PTFE foam.

The design of the present invention allows for the sealing benefits of an elastomer energized seal while keeping the material compatibility of a PTFE only seal. As those skilled in the art know from other sealing applications, an elastomer energized seal provides a much better seal than a PTFE only seal, but elastomers typically lack the corrosion resistance of PTFE. Several competitor designs get around this issue by using the expanded PTFE foam around a solid core of metal or plastic, but this design uses off the shelf elastomers and standard PTFE formulations. To the contrary, the present invention uses the geometry of the PTFE parts to encase the elastomer in PTFE, using a mechanical bond rather than any adhesive. This provides a solution that has the seal performance of an elastomer energized seal but protects the elastomer from contact with anything that may be corrosive or otherwise harmful.

SUMMARY OF THE INVENTION

The design of the present invention consists of three components, two machined from a standard PTFE and one standard sized O-ring. The first component is the main body of the seal, which is a large flat ring with a diameter sized to fit into the hardware of the manway cover. The inside of the ring has a large, shallow chamfer machined into it sized to interface with the inner edge of the dovetail groove in the hardware, holding it in place. The outer edge of the ring has a channel machined into it that is sized to accept the O-ring, and which also has step features machined into it to allow the locking ring to be held in place.

The next component is an O-ring of a standard size, which is pushed into the channel along the outside of the ring. When fully inserted into the groove, the O-ring rests near the center of the seal ring.

The final component is a locking ring. Being much smaller, the locking ring is designed to be inserted in the channel after the O-ring and has step features machined into it corresponding to the ones in the seal ring. These steps interface with each other, creating a mechanical connection that locks the O-ring in place, sealing it off from the outside environment.

The design of the present invention solves the problem of an elastomer energized seal in a harsh environment by completely encasing it in PTFE, but it does so without adhesives or other special processes that add complexity and cost. In addition, the compressibility of the O-ring increases torque retention. In a PTFE only design, the torquing down the bolts for the manway cover can result in compression set in the PTFE. This results in a lower torque needed to loosen the bolts, which means a greater likelihood of them working loose prematurely. This is especially problematic with the expanded PTFE foam some competitors use. However, an elastomer can compress without taking a set, which eliminates this issue. An elastomer energized seal provides for the benefit of the expanded PTFE foam without the compression set issues that come from it.

An embodiment of a manway gasket of the present invention, includes: a seal body having an annular plate shape defining an inner diameter concentrically disposed within an outer diameter and a thickness bounded by an upper surface opposite a lower surface; wherein the upper surface is configured to abut and/or be adjacent to an inside surface of a dovetail groove of a manway cover; a circumferential channel formed in the seal body, the circumferential channel open to and starting from the outer diameter and extending inwards towards the inner diameter while not penetrating through the inner diameter; an O-ring disposed within the circumferential channel; and an annularly shaped locking ring at least partially disposed within the circumferential channel adjacent the O-ring; wherein the O-ring is fully enclosed within the circumferential channel by the seal body and the locking ring.

In other exemplary embodiments, the seal body may comprise PTFE and the O-ring may comprise a resiliently elastic material. Furthermore, the locking ring may comprise PTFE. The O-ring may comprise: Nitrile Butadiene Rubber (NBR), Hydrogenated Nitrile Rubber (HNBR), Fluorocarbon Rubber (FKM), and/or Perfluorocarbon Rubber (FFKM).

In these embodiments of the present invention, no adhesives, glues or bonding agents are used in the manway gasket.

The seal body, the O-ring and the locking ring may be separately manufactured parts which are then assembled forming the manway gasket.

The locking ring may comprise only one cut entirely through a circumferential portion of the locking ring.

A circumferential chamfer may be formed between the inner diameter and the lower surface of the seal body. The circumferential channel may include an annularly shaped undercut with respect to the outer diameter, the annularly shaped undercut forming an overhanging annular portion. The locking ring may comprise an annular protrusion match shaped to at least partially be disposed within the undercut.

The locking ring may be fully disposed within the circumferential channel.

The locking ring may be partially disposed within the circumferential channel and partially disposed beyond the circumferential channel.

The locking ring may comprise a circumferential chamfer on at least one edge extending beyond the circumferential channel.

The circumferential channel may include an upper undercut and a lower undercut with respect to the outer diameter, the upper undercut having an upper extension extending inwardly and lower extension extending inwardly.

The locking ring may have an upper void configured to receive the upper extension and a lower void configured to receive the lower extension.

The locking ring may have a circumferential channel formed from an inside diameter of the locking ring, the circumferential channel separating an upper arm and a lower arm, the upper arm and lower arm configured to flex during installation into the circumferential channel of the seal body.

The circumferential channel may be configured to be fully filled by the O-ring and the locking ring.

The locking ring may comprise an upper circumferential channel formed in the upper surface matched to fit an upper circumferential extension of the circumferential channel of the seal body, and the locking ring may comprise a lower circumferential channel formed in the lower surface matched to fit an upper circumferential extension of the circumferential channel of the seal body.

BRIEF DESCRIPTION OF THE DRAWINGS

The accompanying drawings illustrate the invention. In such drawings:

FIG. 7 is a top view of an embodiment of a manway gasket of the present invention;

FIG. 8 is a sectional view taken along lines 8-8 of FIG. 7;

FIG. 9 is a sectional view of the structures of FIGS. 7-8 now disposed in the dovetail channel of the manway cover;

DETAILED DESCRIPTION OF THE PREFERRED EMBODIMENTS

Figure 1:
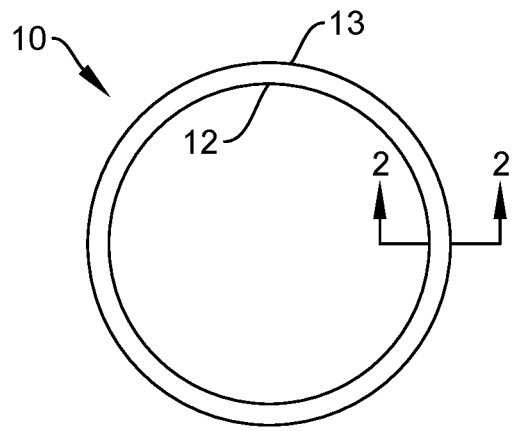
FIG. 1 is a top view of a prior art manway gasket.
Figure 2:
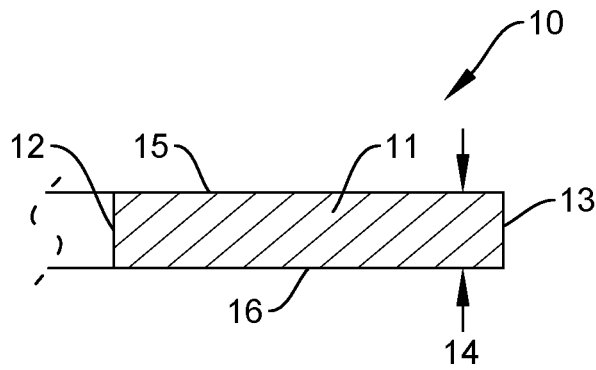
FIG. 2 is a sectional view taken along lines 2-2 of FIG. 1.

FIG. 1 shows a top view of a manway gasket 10 of the prior art. FIG. 2 is a sectional view taken through the structure of FIG. 1 along lines 2-2. As can be seen from FIG. 1, the manway gasket has a seal body 11 having an annular plate shape defining an inner diameter 12 concentrically disposed within an outer diameter 13 and a thickness 14 bounded by an upper surface 15 opposite a lower surface 16. In this case the manway gasket 10 is made only from PTFE and is a solid part throughout. The range of the diameters of these prior art manways and manway gaskets are set by the rail car manufacturer and the standards they follow. Typically, the smallest standard manway is approximately 20 inches to as large as 36 inches. Thickness of the seals are anywhere from ⅛" to ½ ".

Figure 3:
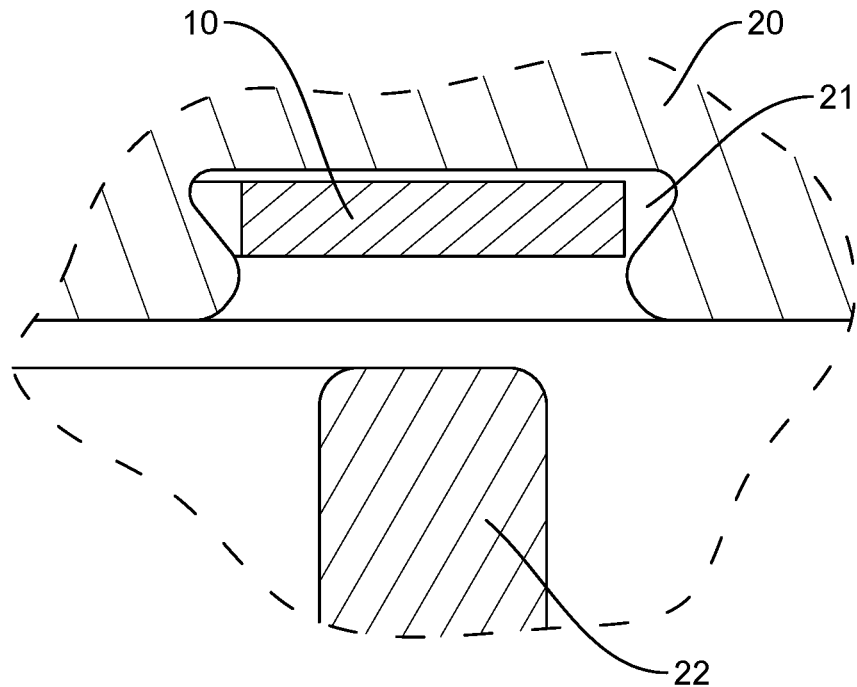
FIG. 3 is a sectional view of the structure of FIGS. 1-2 now disposed in a dovetail channel of a manway cover.

FIG. 3 is a sectional view similar to FIG. 2 now showing the manway gasket 10 captured onto a manway cover 20, where the manway gasket is disposed within a dovetail groove 21. The manway opening 22 is shown below the manway cover and the manway gasket. As the manway cover 20 pivots downwards towards the manway opening, the manway gasket is captured therebetween and is compressed forming a seal.

The main problem with these prior art designs comes from the tendency of the PTFE to take a compression set. When the manway cover is bolted into place, the torque applied to the bolts pinches the PTFE between the manway and the lid. This deforms the seal to conform to the space between the two parts and creates the seal. Unfortunately, when the PTFE is compressed, there is no spring back when the pressure is removed. Accordingly, any loosening of the bolts or shifting of the lid creates more space and takes the pressure off the seal, which could cause seal failure. Some prior art designs attempt to solve this by using an expanded PTFE foam material, which allows the material some compression without taking a set.

Figure 4:
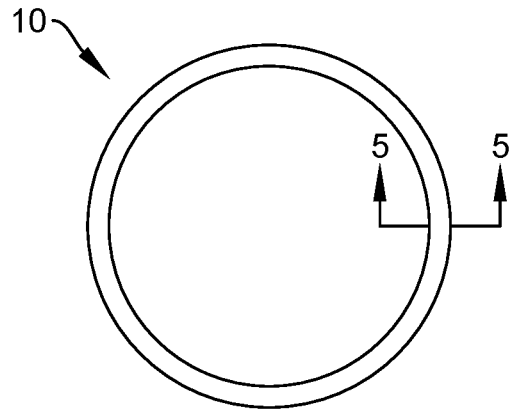
FIG. 4 is a top view of a prior art manway gasket.
Figure 5:
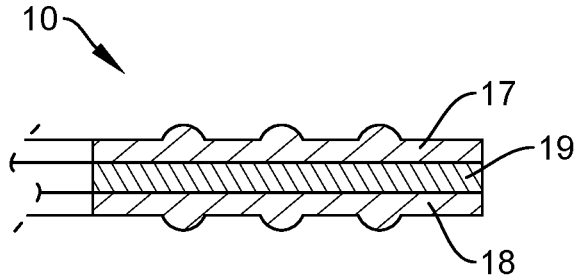
FIG. 5 is a sectional view taken along lines 5-5 of FIG. 4.
Figure 6:
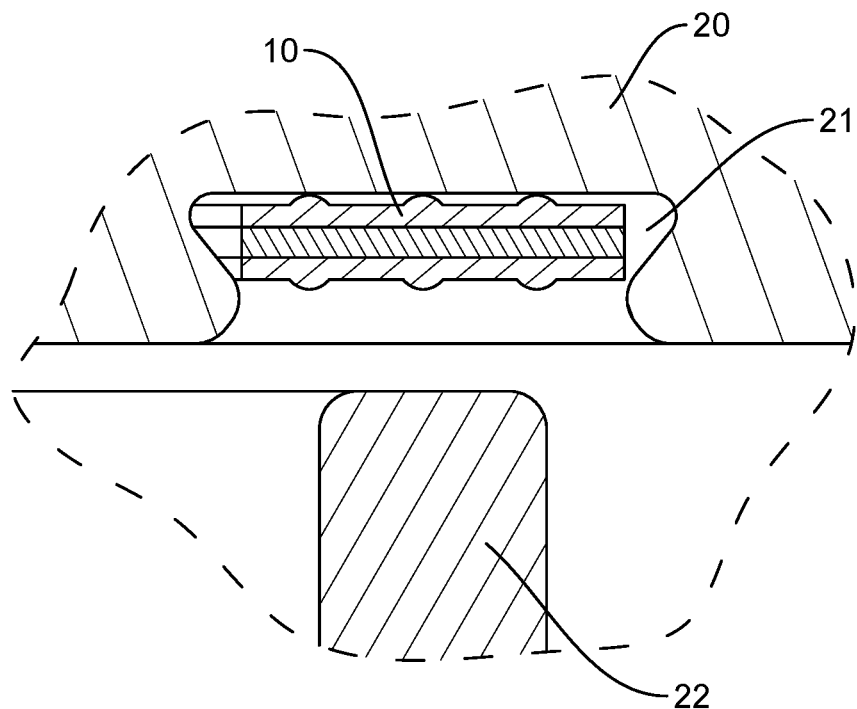
FIG. 6 is a sectional view of the structure of FIGS. 4-5 now disposed in the dovetail channel of the manway cover.

FIG. 4 shows a top view of another manway gasket 10 of the prior art. FIG. 5 is a sectional view taken through the structure of FIG. 2 along lines 5-5. FIG. 6 shows the manway gasket of FIGS. 4 and 5 disposed with the dovetail groove of the manway cover.

As best seen in FIG. 5, this manway gasket 10 is a composite made of two different materials. The top portion 17 and lower portion 18 are made from an expanded PTFE foam whereas the center portion 19 is made from a solid PTFE core. The top and bottom portions 17, 18 are bonded to the center PTFE core 19.

The problem with this prior art design (in addition to a need to develop a new, expanded foam material) is in the manufacturing cost and time associated with the assembly. PTFE requires significant preparation to be glued together, further adding to assembly times. There is also the matter of chemical compatibility for the adhesive used, which could potentially negate the benefits of using PTFE to begin with.

As can be seen from the prior art, a new solution is needed that utilizes a mechanically assembled seal that is free from adhesives and bonding agents and allows the seal design to utilize existing materials readily available such as an elastomer energized seal.

FIG. 7 is a top view of an embodiment of a manway gasket 30 of the present invention and FIG. 8 is a sectional view taken along lines 8-8 of FIG. 7. The manway gasket has a seal body 31 that has an annular plate shape as best seen in FIG. 7. The seal body defines an inner diameter 32 concentrically disposed within an outer diameter 33. A thickness 34 is bounded by an upper surface 35 opposite a lower surface 36.

FIG. 9 is a sectional view of the structures of FIGS. 7-8 now disposed in the dovetail channel 21 of the manway cover 20. The upper surface 35 is configured to abut or be adjacent to an inside surface 23 of the dovetail groove of the manway cover.

Referring to FIG. 8, there is a circumferential channel 37 in the seal body. The circumferential channel is open to and starts from the outer diameter and extends inwards towards the inner diameter while not penetrating through the inner diameter. The shape of the circumferential channel can vary as will be shown in other embodiments. An O-ring 38 is disposed within the circumferential channel. The O-ring can have a circular sectional profile as shown herein, or take on a sectional profile of a square, a rectangle, a hexagon, a triangle or any other shape known to those skilled in the art.

The O-ring can be made from any standard material available. The most common of elastomer materials are: Nitrile Butadiene Rubber (NBR), Hydrogenated Nitrile Rubber (HNBR), Fluorocarbon Rubber (FKM), and Perfluorocarbon Rubber (FFKM). Given that the point of encasing the elastomer is to utilize the chemical resistance of the PTFE, it is likely the cheapest option (The NBR) will be the most common. As can be appreciated by those skilled in the art, the novel design of the present invention allows the use of such cheapest option such that the overall cost of the manway gasket can be kept low providing a marketing advantage over competing designs.

An annularly shaped locking ring 40 is at least partially disposed within the circumferential channel adjacent the O-ring. The locking ring fills the opening of the circumferential channel such that the O-ring is fully enclosed. Thus, the O-ring is fully enclosed within the circumferential channel by the seal body and the locking ring.

Figure 10:
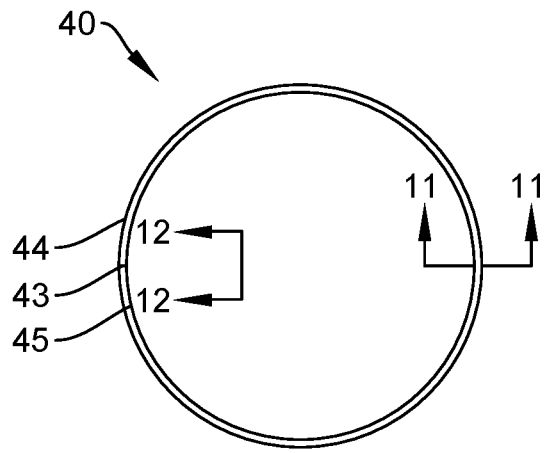
FIG. 10 is a top view of the locking ring from the structure of FIGS. 8-9.
Figure 11:
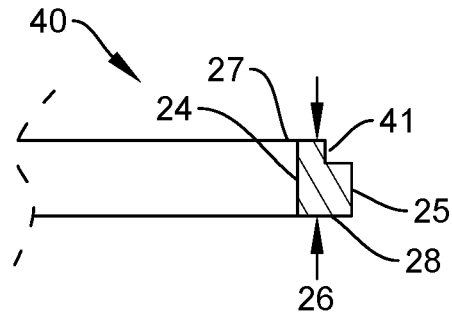
FIG. 11 is a sectional view taken along lines 11-11 of FIG. 10.

FIG. 10 is a top view of the locking ring from the structure of FIGS. 8-9 and FIG. 11 is a sectional view taken along lines 11-11 of FIG. 10. The locking ring can be defined as having an inner diameter 24 opposite an outer diameter 25. The locking ring has a thickness 26 defined between an upper surface 27 and a lower surface 28.

As shown in FIG. 11, the locking ring has an L-shaped cross section. There is a void 41 that matches an extension 42 as best seen in FIG. 8. The void and extension are matched to fit one another such that once the locking ring is placed within the circumferential channel it tends to stay in place.

Figure 12:
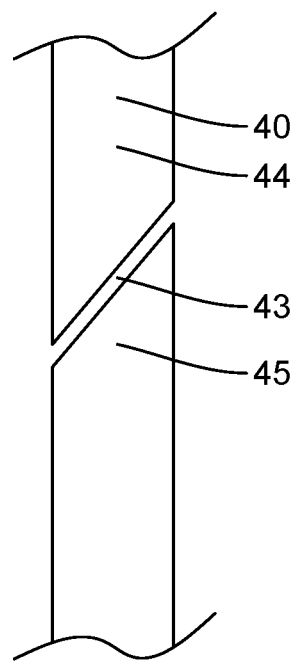
FIG. 12 is an enlarged view taken along lines 12-12 of FIG. 10.

FIG. 12 is an enlarged view taken along lines 12-12 of FIG. 10. The locking ring has just one slice 41. The slice allows the locking ring to separate during installation into the circumferential channel of the seal body. The O-ring has no such slice as it is resilient enough (i.e., stretch) to be installed within the circumferential channel as a continuous part. The slice can be formed at any angle as long as the two ends 44 and 45 can be separated to facilitate installation within the circumferential channel of the seal body.

Figure 13:
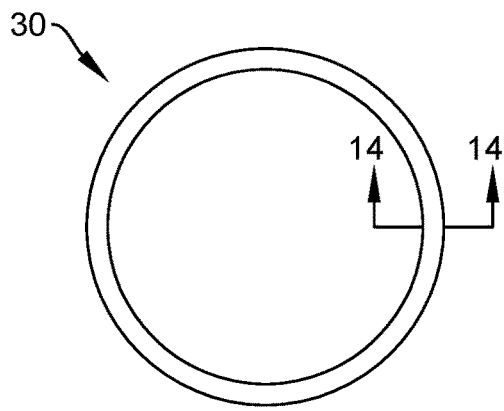
FIG. 13 is a top view of another embodiment of a manway gasket of the present invention.
Figure 14:
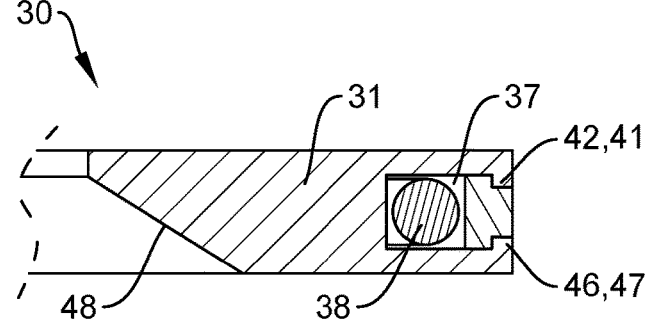
FIG. 14 is a sectional view taken along lines 14-14 of FIG. 13.
Figure 15:
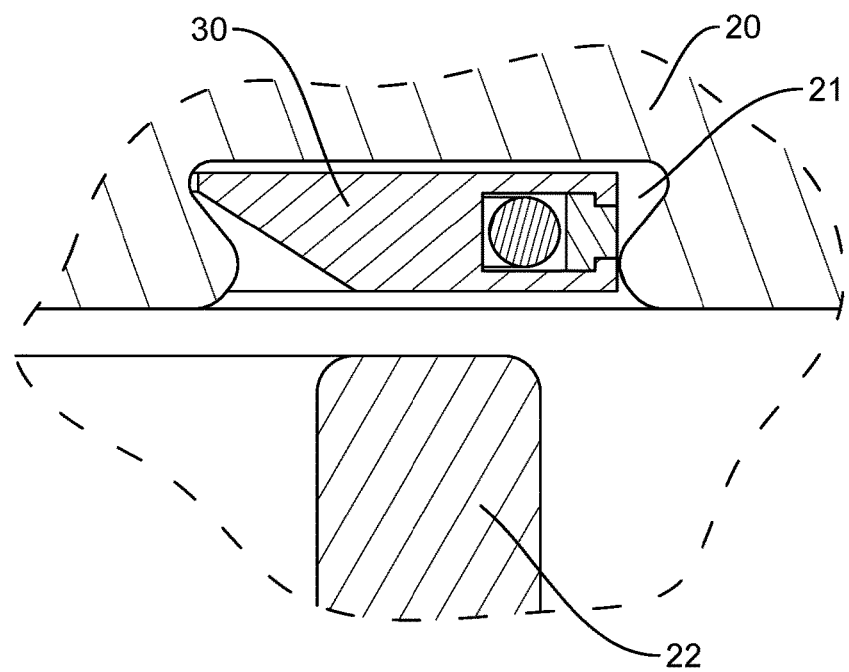
FIG. 15 is a sectional view of the structures of FIGS. 13-14 now disposed in the dovetail channel of the manway cover.

FIG. 13 is a top view of another embodiment of a manway gasket of the present invention and FIG. 14 is a sectional view taken along lines 14-14 of FIG. 13. FIG. 15 is a sectional view of the structures of FIGS. 13-14 now disposed in the dovetail channel of the manway cover.

In this embodiment, the opening of the circumferential channel has both an upper extension 42 and a lower extension 46. Similarly matched, the locking ring 40 has an upper void 41 and a lower void 47. Similar to FIG. 12, the embodiment of FIGS. 13-15 would likewise have a single slice 43 through the locking ring for ease of installation.

Referring to the embodiments in FIGS. 7-15 there is an optional circumferential chamfer 48. The chamfer can take on any angle or shape. Alternatively, the chamfer can even be a rounded edge. The main purpose of the chamfer is to interface with the edge of the groove to hold the seal in place when the manway is open and help with installation. It is preferred that the angle of the chamfer is less than the angle of the dovetail groove.

Figure 16:
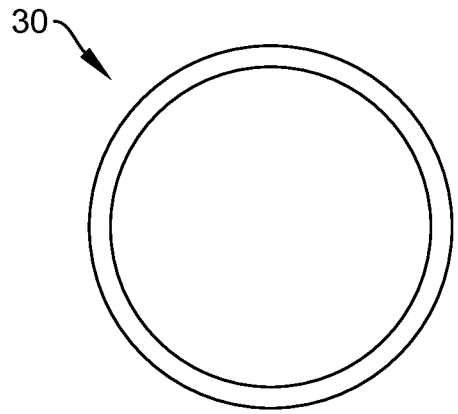
FIG. 16 is a top view of another embodiment of a manway gasket of the present invention.
Figure 17:
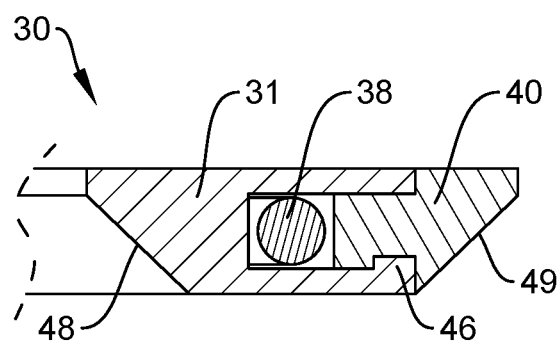
FIG. 17 is a sectional view taken along lines 17-17 of FIG. 16.
Figure 18:
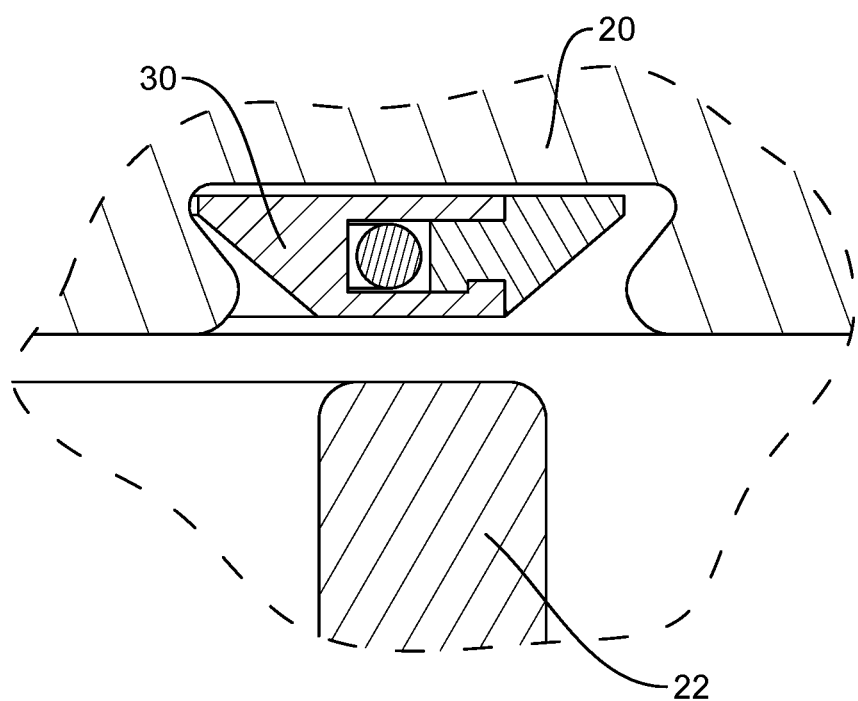
FIG. 18 is a sectional view of the structures of FIGS. 16-17 now disposed in the dovetail channel of the manway cover.

FIG. 16 is a top view of another embodiment of a manway gasket of the present invention and FIG. 17 is a sectional view taken along lines 17-17 of FIG. 16. FIG. 18 is a sectional view of the structures of FIGS. 16-17 now disposed in the dovetail channel of the manway cover. In this embodiment, the locking ring now has a chamfer 49. Again, the chamfer can be of any size and shape and may be a rounded edge or the like. In this embodiment, there is only the lower extension 46 and no upper extension as in the previous embodiments. As can be appreciated by those skilled in the art, a multitude of shapes and sizes of the locking ring may be made to fit within the opening of the circumferential channel.

Figure 19:
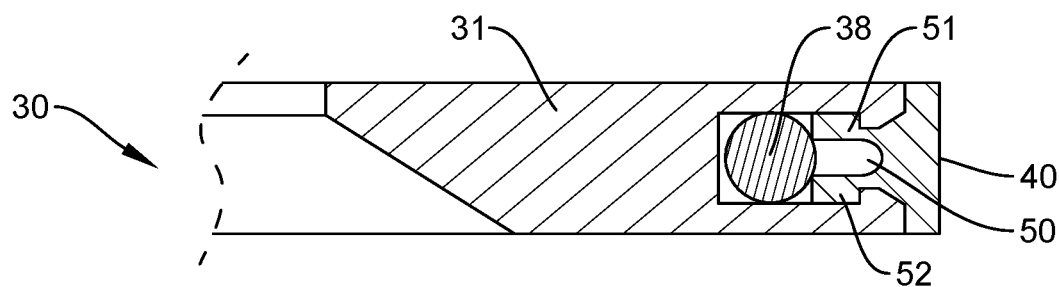
FIG. 19 is a sectional view similar to that of FIGS. 8, 14 and 17 now showing another embodiment of the manway gasket of the present invention.

FIG. 19 is a sectional view similar to that of FIGS. 8, 14 and 17 now showing another embodiment of the manway gasket of the present invention. Here, the locking ring 40 has a centered circumferential channel 50 that allows an upper arm 51 and a lower arm 52 to flex during installation and snap into place once captured by the matching undercuts of the opening of the circumferential channel.

Figure 20:
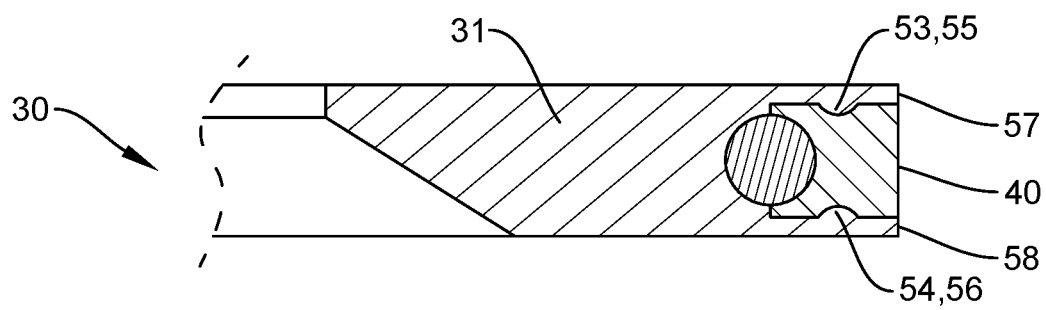
FIG. 20 is a sectional view similar to that of FIGS. 8, 14 and 17 now showing another embodiment of the manway gasket of the present invention.

FIG. 20 is a sectional view similar to that of FIGS. 8, 14 and 17 now showing another embodiment of the manway gasket of the present invention. Here, the locking ring has an upper circumferential channel 53 formed in the upper surface and a lower circumferential channel 54 formed in the lower surface that are matched to fit an upper circumferential extension 55 and a lower circumferential extension 56 of the seal body. In this manner, the locking ring would snap into place and be captured by the respective channels and extensions. During installation an upper arm 57 and a lower arm 58 of the seal body would flex outwardly to allow the locking ring to be placed within. Furthermore, the ends of the circumferential channel and the locking ring fully capture and enclose the O-ring in a perfect fit such that no gaps or clearances remain.

Figure 21:
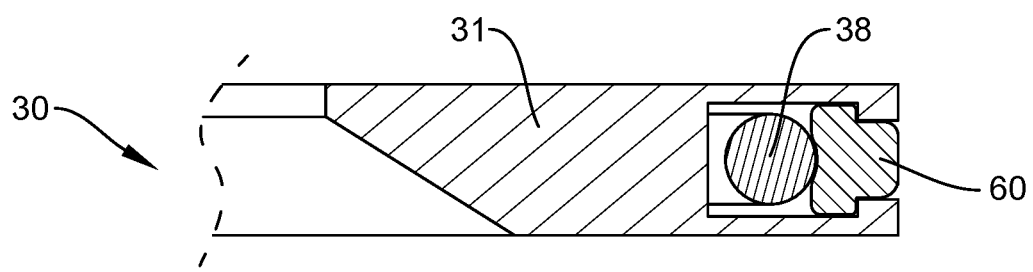
FIG. 21 is a sectional view similar to that of FIGS. 8, 14 and 17 now showing another embodiment of the manway gasket of the present invention.

FIG. 21 is a sectional view similar to that of FIGS. 8, 14 and 17 now showing another embodiment of the manway gasket of the present invention. Here, the locking ring has been replaced by the use of a flowable (i.e., liquid, fluid, caulk) silicone 60. The silicone has low enough of a viscosity such that it can be injected into a specific location, but not too low of a viscosity such that it flows undesirably away from where it was disposed. As with previous embodiments, the O-ring 38 would be installed in the center channel 50. Thereafter, the remaining gap would be piped full of silicone that would be allowed to solidify over at least a period of time. In this manner, the O-ring is sealed within the seal body 31.

As can be understood by the various embodiments, the locking ring physically captures the O-ring within the circumferential channel such that no adhesive, glues or bonding agents are used in the manway gasket. Thus, it is understood that the seal body, the O-ring and the locking ring are separately manufactured parts which are assembled forming the manway gasket.

As used herein, an annular plate shape means a flat ring, an annular cylinder and/or a cylindrical annulus.

As used herein, an undercut means to cut away material from the underside of (an object) so as to leave an overhanging portion in relief.

Although several embodiments have been described in detail for purposes of illustration, various modifications may be made to each without departing from the scope and spirit of the invention. Accordingly, the invention is not to be limited, except as by the appended claims.

NUMERALS 10 manway gasket, prior art
11 seal body
12 inner diameter, seal body
13 outer diameter, seal body
14 thickness, seal body
15 upper surface, seal body
16 lower surface, seal body
20 manway cover
21 dovetail groove, manway cover
22 manway opening
23 inside surface, dovetail groove
24 inner diameter, locking ring
25 outer diameter, locking ring
26 thickness, locking ring
27 upper surface, locking ring
28 lower surface, locking ring
30 manway gasket, invention
31 seal body
32 inner diameter, seal body
33 outer diameter, seal body
34 thickness, seal body
35 upper surface, seal body
36 lower surface, seal body
37 circumferential channel, seal body
38 O-ring
40 locking ring
41 void, locking ring
42 extension, seal body
43 slice, locking ring
44 end, locking ring
45 end, locking ring
46 lower extension, seal body
47 lower void, locking ring
48 chamfer, seal body
49 chamfer, locking ring
50 circumferential channel, locking ring
51 upper arm, locking ring
52 lower arm, locking ring
53 upper circumferential channel, locking ring
54 lower circumferential channel, locking ring
55 upper circumferential extension, seal body
56 lower circumferential extension, seal body
57 upper arm, seal body
58 lower arm, seal body
60 silicone

What is claimed is:
1. A manway gasket, comprising:
a seal body having an annular plate shape defining an inner diameter concentrically disposed within an outer diameter and a thickness bounded by an upper surface opposite a lower surface;
wherein the upper surface is configured to abut and/or be adjacent to an inside surface of a dovetail groove of a manway cover;
a circumferential channel formed in the seal body, the circumferential channel open to and starting from the outer diameter and extending inwards towards the inner diameter while not penetrating through the inner diameter;
an O-ring disposed within the circumferential channel; and
an annularly shaped locking ring at least partially disposed within the circumferential channel adjacent the O-ring, wherein the locking ring is configured to physically engage the circumferential channel capturing the O-ring disposed therein;
wherein the O-ring is fully enclosed within the circumferential channel by the seal body and the locking ring;
wherein the seal body or the locking ring comprises PTFE;
wherein no portion of the manway gasket extends beyond the outer diameter of the seal body or an outer diameter of the annularly shaped locking ring.
2. The manway gasket of claim 1, wherein the seal body comprises PTFE and the O-ring comprises a resiliently elastic material.
3. The manway gasket of claim 1, wherein the locking ring comprises PTFE.
4. The manway gasket of claim 1, wherein the O-ring comprises: Nitrile Butadiene Rubber (NBR), Hydrogenated Nitrile Rubber (HNBR), Fluorocarbon Rubber (FKM), and/or Perfluorocarbon Rubber (FFKM).
5. The manway gasket of claim 1, wherein no adhesives, glues or bonding agents are used in the manway gasket.
6. The manway gasket of claim 1, wherein the seal body, the O-ring and the locking ring are separately manufactured parts which are then assembled forming the manway gasket.
7. The manway gasket of claim 1, wherein the locking ring comprises only one cut entirely through a circumferential portion of the locking ring.
8. The manway gasket of claim 1, including a circumferential chamfer formed between the inner diameter and the lower surface of the seal body.
9. The manway gasket of claim 1, wherein the circumferential channel includes an annularly shaped undercut with respect to the outer diameter, the annularly shaped undercut forming an overhanging annular portion.
10. The manway gasket of claim 9, wherein the locking ring comprises an annular protrusion match shaped to at least partially be disposed within the undercut.
11. The manway gasket of claim 1, wherein the locking ring is fully disposed within the circumferential channel.
12. The manway gasket of claim 1, wherein the locking ring is partially disposed within the circumferential channel and partially disposed beyond the circumferential channel.
13. The manway gasket of claim 12, wherein the locking ring comprises a circumferential chamfer on at least one edge extending beyond the circumferential channel.
14. The manway gasket of claim 1, wherein the circumferential channel includes an upper undercut and a lower undercut with respect to the outer diameter, the upper undercut having an upper extension extending inwardly and lower extension extending inwardly.

15. The manway gasket of claim 14, wherein the locking ring has an upper void configured to receive the upper extension and a lower void configured to receive the lower extension.

16. The manway gasket of claim 15, wherein the locking ring has a circumferential channel formed from an inside diameter of the locking ring, the circumferential channel separating an upper arm and a lower arm, the upper arm and lower arm configured to flex during installation into the circumferential channel of the seal body.

17. The manway gasket of claim 1, wherein the circumferential channel is configured to be fully filled by the O-ring and the locking ring.

18. The manway gasket of claim 1, the locking ring comprises an upper circumferential channel formed in the upper surface matched to fit an upper circumferential extension of the circumferential channel of the seal body, and the locking ring comprises a lower circumferential channel formed in the lower surface matched to fit an upper circumferential extension of the circumferential channel of the seal body.

19. A manway gasket, comprising:
a seal body consisting of PTFE having an annular plate shape defining an inner diameter concentrically disposed within an outer diameter and a thickness bounded by an upper surface opposite a lower surface;
wherein the upper surface is configured to abut and/or be adjacent to an inside surface of a dovetail groove of a manway cover;
a circumferential channel formed in the seal body, the circumferential channel open to and starting from the outer diameter and extending inwards towards the inner diameter while not penetrating through the inner diameter;
an O-ring disposed within the circumferential channel, the O-ring comprising a resiliently elastic material; and
an annularly shaped locking ring at least partially disposed within the circumferential channel adjacent the O-ring, wherein the locking ring comprises only one cut entirely through a circumferential portion of the locking ring, and wherein the locking ring is configured to physically engage the circumferential channel capturing the O-ring disposed therein;
wherein the O-ring is fully enclosed within the circumferential channel by the seal body and the locking ring;
wherein the seal body, the O-ring and the locking ring are separately manufactured parts which are then assembled forming the manway gasket; and
wherein no adhesive, glues or bonding agents are used in the manway gasket.

20. A manway gasket, consisting of:
a seal body having an annular plate shape defining an inner diameter concentrically disposed within an outer diameter and a thickness bounded by an upper surface opposite a lower surface;
wherein the upper surface is configured to abut and/or be adjacent to an inside surface of a dovetail groove of a manway cover;
a circumferential channel formed in the seal body, the circumferential channel open to and starting from the outer diameter and extending inwards towards the inner diameter while not penetrating through the inner diameter;
an O-ring disposed within the circumferential channel, the O-ring comprising a resiliently elastic material; and
an annularly shaped locking ring at least partially disposed within the circumferential channel adjacent the O-ring, wherein the locking ring comprises only one cut entirely through a circumferential portion of the locking ring;
wherein the O-ring is fully enclosed within the circumferential channel by the seal body and the locking ring;
wherein the seal body, the O-ring and the locking ring are separately manufactured parts which are then assembled forming the manway gasket; and
wherein no adhesive, glues or bonding agents are used in the manway gasket.

* * * * *